(12) United States Patent
De Vallois et al.

(10) Patent No.: US 9,760,243 B2
(45) Date of Patent: Sep. 12, 2017

(54) METHOD AND APPARATUS FOR PROVIDING A TRANSITION BETWEEN MAP REPRESENTATIONS ON A USER INTERFACE

(71) Applicant: HERE Global B.V., Veldhoven (NL)

(72) Inventors: Arnaud De Vallois, Berlin (DE); Craig Barnes, Forest Park, IL (US)

(73) Assignee: HERE Global B.V., Veldhoven (NL)

(*) Notice: Subject to any disclaimer, the term of this patent is extended or adjusted under 35 U.S.C. 154(b) by 295 days.

(21) Appl. No.: 14/674,805

(22) Filed: Mar. 31, 2015

(65) Prior Publication Data

US 2016/0291834 A1    Oct. 6, 2016

(51) Int. Cl.

| | |
|---|---|
| *G06F 3/048* | (2013.01) |
| *G06F 3/0481* | (2013.01) |
| *G06T 13/20* | (2011.01) |
| *G06T 19/00* | (2011.01) |
| *G01C 21/36* | (2006.01) |

(52) U.S. Cl.
CPC ....... *G06F 3/04815* (2013.01); *G01C 21/367* (2013.01); *G01C 21/3635* (2013.01); *G01C 21/3676* (2013.01); *G06T 13/20* (2013.01); *G06T 19/003* (2013.01)

(58) Field of Classification Search
None
See application file for complete search history.

(56) References Cited

U.S. PATENT DOCUMENTS

| | | | |
|---|---|---|---|
| 2011/0301843 A1 | 12/2011 | Gale et al. | |
| 2013/0169685 A1 | 7/2013 | Lynch | |
| 2013/0317735 A1* | 11/2013 | Mann | G01C 21/3697 |
| | | | 701/400 |
| 2014/0098142 A1* | 4/2014 | Lee | G06F 3/04845 |
| | | | 345/676 |

\* cited by examiner

*Primary Examiner* — Tuan S Nguyen
(74) *Attorney, Agent, or Firm* — Ditthavong & Steiner, P.C.

(57) ABSTRACT

An approach is provided for presenting transition animations on a user interface. The approach involves presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface. The approach also involves determining at least one straight-line representation of the at least one spline representation. The approach further involves transposing of the one or more map representations from the at least one spline representation to the at least one straight-line representation. The approach also involves causing a presentation of one or more transition animations generated to show at least one transition from the at least one spline representation to the at least one straight-line representation.

19 Claims, 20 Drawing Sheets

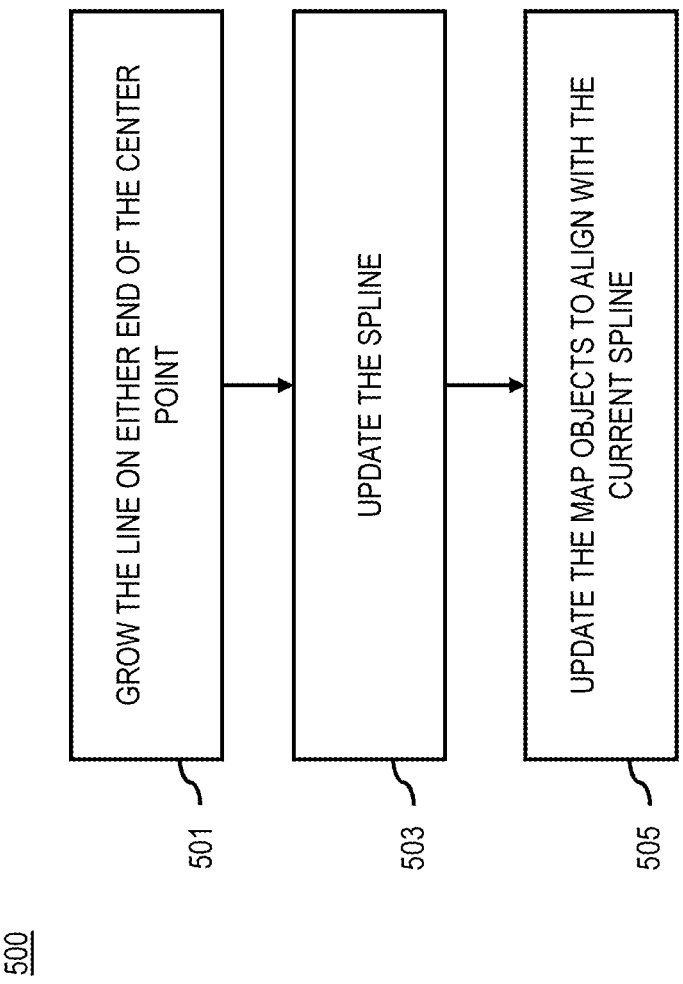

METHOD AND APPARATUS FOR PROVIDING A TRANSITION BETWEEN MAP REPRESENTATIONS ON A USER INTERFACE

BACKGROUND

Service providers and developers are continually challenged to deliver value and convenience to consumers by, for example, providing compelling network services. One area of interest has been the provision of several views or perspectives of map representations that allow for user interaction. However, such representations typically provide a zoomed out top-down overview of a journey or route, or a series of text descriptions displayed in a list-view. Further, users' default map view and any view generated due to user interaction are displayed exclusively on the user interface. As a result, the users cannot associate various map representations with each other. Accordingly, service providers and developers face significant technical challenges in enabling users to freely and easily interact with several map representation on the user interface.

SOME EXAMPLE EMBODIMENTS

Therefore, there is a need for an approach for providing transition between map representations on a user interface.

According to one embodiment, a method comprises causing, at least in part, a presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface. The method also comprises determining at least one straight-line representation of the at least one spline representation. The method further comprises causing, at least in part, a transposing of the one or more map representations from the at least one spline representation to the at least one straight-line representation. The method further comprises causing, at least in part, a presentation of one or more transition animations generated to show at least one transition from the at least one spline representation to the at least one straight-line representation.

According to another embodiment, an apparatus comprises at least one processor, and at least one memory including computer program code, the at least one memory and the computer program code configured to, with the at least one processor, cause, at least in part, the apparatus to cause, at least in part, a presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface. The apparatus is further caused to determine at least one straight-line representation of the at least one spline representation. The apparatus is also caused to cause, at least in part, a transposing of the one or more map representations from the at least one spline representation to the at least one straight-line representation. The apparatus is further caused to cause, at least in part, a presentation of one or more transition animations generated to show at least one transition from the at least one spline representation to the at least one straight-line representation.

According to another embodiment, an apparatus comprises means for causing, at least in part, a presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface. The apparatus further comprises means for determining at least one straight-line representation of the at least one spline representation. The apparatus also comprises means for causing, at least in part, a transposing of the one or more map representations from the at least one spline representation to the at least one straight-line representation. The apparatus further comprises means for causing, at least in part, a presentation of one or more transition animations generated to show at least one transition from the at least one spline representation to the at least one straight-line representation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5 illustrates the process for presenting the transition animation on the user interface, according to one embodiment;

DESCRIPTION OF SOME EMBODIMENTS

Examples of a method, apparatus, and computer program for providing transitions between map representations on a user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
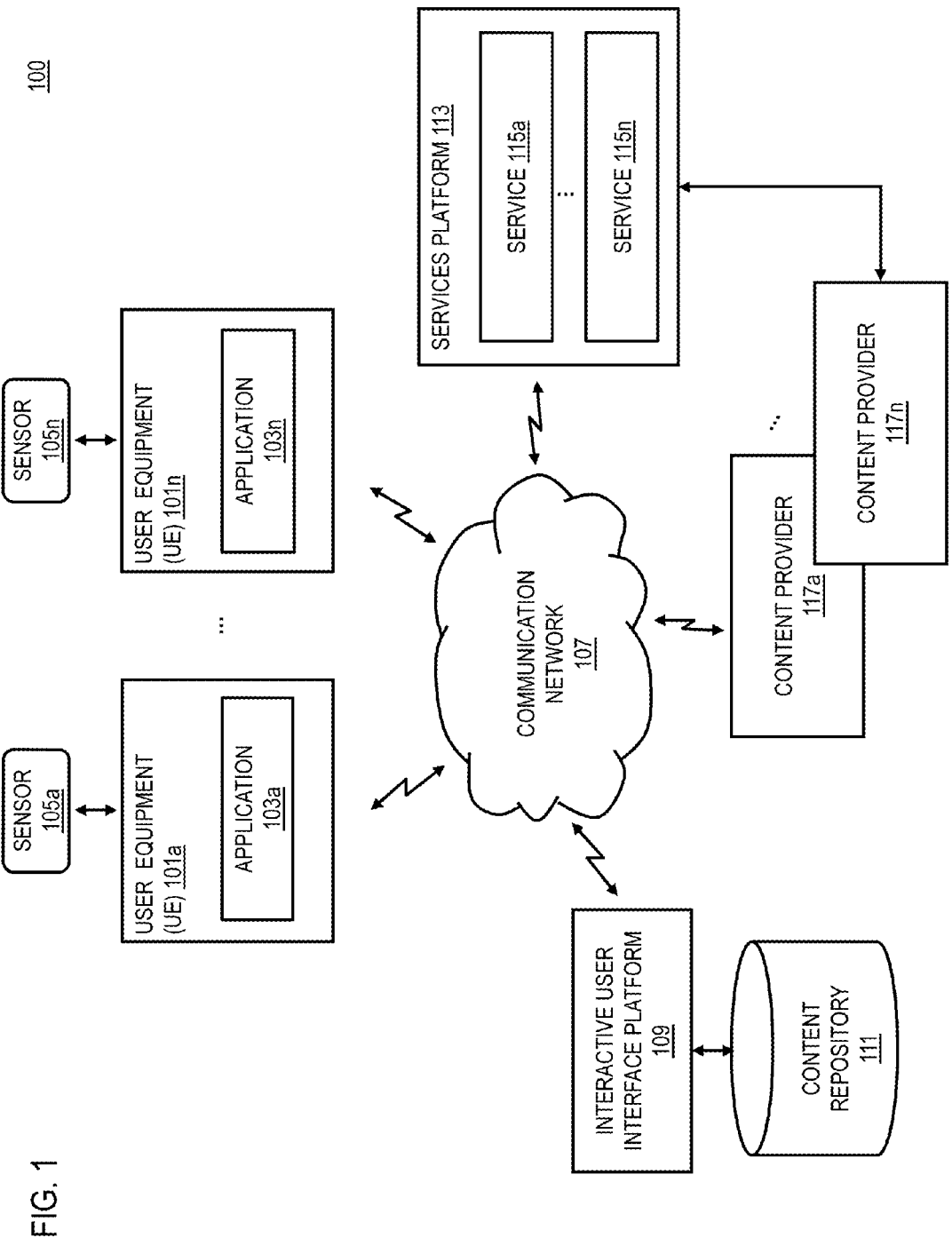
FIG. 1 is a diagram of a system capable of providing transitions between map representations on a user interface, according to one embodiment.

FIG. 1 is a diagram of a system capable of providing transitions between map representations on a user interface, according to one embodiment. As noted previously, users may interact with maps to view map elements (e.g., paths, routes, buildings, etc.) from different views. For example, the users may pan, zoom, or rotate the map to understand the current location or route to a destination. Further, the users may view 2D or 3D representations of the map to understand the surroundings or environment. However, traditional implementations of user interfaces for provide only one map representation at a time. For example, the user interface may display a 2D representation of a route on the map by default, and a 3D representation is displayed as an alternate to the 2D representation on the same user interface. Therefore, the association of the two-dimensional (2D) representation with the three-dimensional (3D) representation is confusing for the users, as it is difficult to understand the transition between these representations.

To address this problem, a system 100 of FIG. 1 provides a solution for transitioning between one or more map representations on a user interface. As noted previously, various map representations may be provided to users of system 100. For example, the map representations may include map objects such as routes, building, Points of Interest (POIs), landmarks etc., displayed on 2D or 3D space on the user interface.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the interactive user interface platform 109 via the communication network 107. In one embodiment, the interactive user interface platform 109 performs the functions associated with providing transitions between map representations.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as, mapping applications, location-based service applications, navigation applications, content provisioning services, camera/imaging application, media player applications, social networking applications, calendar applications, and the like. In one embodiment, one of the applications 103 at the UE 101 may act as a client for the interactive user interface platform 109 and perform one or more functions of the interactive user interface platform 109. In one scenario, users are able to use different map modes, for example, photorealistic map, augmented reality map, etc., via one or more map applications.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, etc.). In one scenario, the one or more sensors 105 may detect properties for one or more display surfaces, for example, if the sensors 105 determines the surface for at least one object to be smooth, such feature may be implemented in the calculation of scores and/or ranking. In another scenario, the one or more UE 101 may have structure sensors, whereby the sensor data may be calculated either on the cloud or by the UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the interactive user interface platform 109 may be a platform with multiple interconnected components. The interactive user interface platform 109 may include multiple servers, intelligent networking devices, computing devices, components and corresponding software for providing transitions between the map representations (e.g., the spline representation and straight-line representation).

In one embodiment, the interactive user interface platform 109 presents the map representations on the map interface based on one or more map routes or map objects selected by the users. For example, a user may provide a start point and a destination point on the user interface to generate the map routes. In one embodiment, the map route may be presented as a spline representation. By way of example, the spline representation of a map route may include connections of one or more lines, or one or more curves connected, or a combination thereof to represent a path or route. In one embodiment, the spline representation may be provided in a 2D or a 3D space represented on the user interface.

In one embodiment, the interactive user interface platform 109 determines a straight-line representation of the spline representation of the map route. By way of example, the straight-line representation of the map route may include a straight line connecting two points on the map. In one embodiment, the straight-line representation may include representation of one or more map objects along the map route. In another embodiment, the straight-line representation includes a skyline representation of the at least the map route, one or more map objects, or a combination thereof.

In one embodiment, the interactive user interface platform 109 transposes the map representations from the spline representation to the straight-line representation. The transposition may involve association of the map elements with the straight-line representation and spline representation. For example, location of a building on spline representation of the map route may be associated with a point on the straight-line representation, or vice versa. In one embodiment, a database such as a content repository 111 may be used to store and query data associated with the location or points of the map elements for the straight-line representation and spline representation.

In one embodiment, the interactive user interface platform 109 generates at least one transition from the spline representation to the straight-line representation. The transition may be presented as one or more transition animation on the user interface. By way of example, the transition animation may include transformation of a spline representation in 3D space to a straight-line representation in 2D space for a map route. In one embodiment, the transition animation includes a flattening of the spline representation into the straight-line representation. The interactive user interface platform 109 may compute one or more points on the spline representation to be added to the straight-line representation for flattening. In one embodiment, the flattening of the spline representation is determined with respect to a center point of the spline representation. For example, the center point may be a bisector of the original path or route in the spline representation.

In one embodiment, the interactive user interface platform 109 determines a first camera position associated with the spline representation and a second camera position associated with the straight-line representation. The transition animation may therefore include transitioning from the first camera position to the second camera position, in one embodiment. In one embodiment, the transitioning of the camera may be performed based on the center point.

In one embodiment, the interactive user interface platform 109 may determine that there are multiple routes. By way of example, the user may provide a start point and a destination point; accordingly the interactive user interface platform 109 may determine multiple routes between these points. The interactive user interface platform 109 may present the multiple routes as stacked representation of multiple straight-line representations, in one embodiment. The stacked representation is illustrated with reference to FIG. 16. In one embodiment, the interactive user interface platform 109 presents the straight-line representation in a first window and the spline representation in a second window on the user interface. The window representation is illustrated with reference to FIG. 17. Therefore, the interactive user interface platform 109 enables the user to view multiple map representations on the user interface, making it simpler to navigate and associate the different representations. In one embodiment, if the interactive user interface platform 109 determines at least one interaction with respect to the straight-line representation, then a corresponding interaction with the spline representation is caused. In another embodiment, if the interactive user interface platform 109 determines at least one interaction with respect to the straight-line representation, then a corresponding interaction with the spline representation is caused. By way of example, when the user pans the spline representation in the first window, accordingly, the interactive user interface platform 109 causes panning of the straight-line representation in the second window (and vice versa).

In one embodiment, the interactive user interface platform 109 maintains one or more interactive user interface elements during the transition from the spline representation to the straight-line representation. The interactive user interface elements include map elements or objects that can be interacted with by through the user interface. For example, the interactive user interface elements include points on the route that can be selected or dragged by the user.

In one embodiment, the interactive user interface platform 109 may receive content information from various sources, for example, the sensors 105, third-party content providers, databases, etc., and may store the received information on the content repository 111. The content repository 111 may include identifiers to the UE 101 as well as associated information. Further, the information may be any multiple types of information that can provide means for aiding in the content provisioning process. In a further embodiment, the content repository 111 assists by providing information on map objects such as building, POIs, or points along a route to be used for generating the map representations.

The services platform 113 may include any type of service. By way of example, the services platform 113 may include content (e.g., audio, video, images, etc.) provisioning services, application services, storage services, contextual information determination services, location based services, social networking services, information (e.g., weather, news, etc.) based services, etc. In one embodiment, the services platform 113 may interact with the UE 101, the interactive user interface platform 109 and the content provider 117a-117n (hereinafter content provider 117) to supplement or aid in the processing of the content information. By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability.

The content provider 117 may provide content to the UE 101, the interactive user interface platform 109, and the services 115 of the services platform 113. The content provided may be any type of content, such as image content, video content, audio content, textual content, etc. In one embodiment, the content provider 117 may provide content that may supplement content of the applications 103, the sensors 105, the content repository 111 or a combination thereof. By way of example, the content provider 117 may provide content that may aid in causing a presentation of transitions between the map representations. In one embodiment, the content provider 117 may also store content associated with the UE 101, the interactive user interface platform 109, and the services 115 of the services platform 113. In another embodiment, the content provider 117 may manage access to a central repository of data, and offer a consistent, standard interface to data, such as a repository of users' navigational data content.

By way of example, the UE 101, the interactive user interface platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
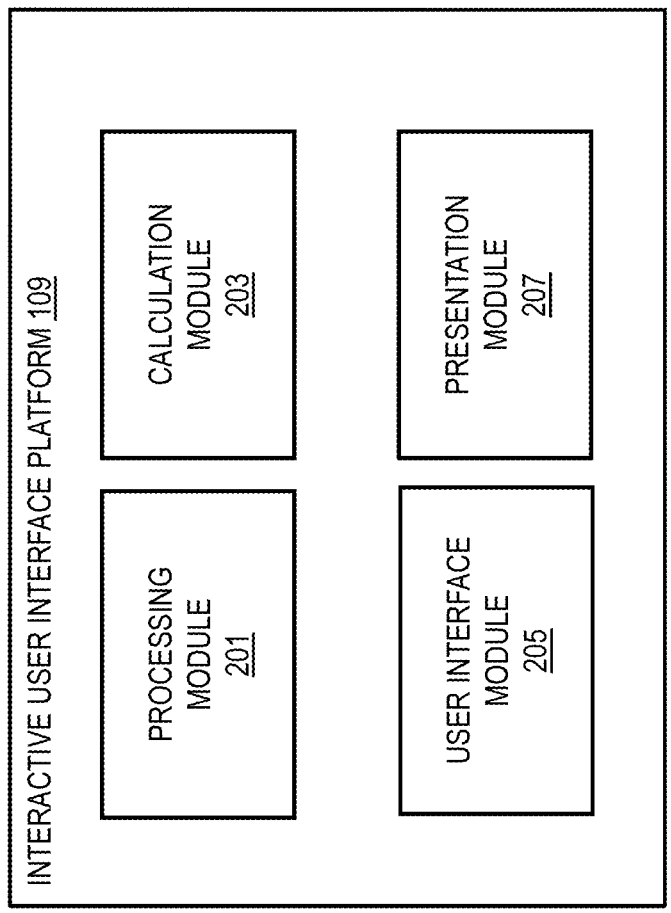
FIG. 2 is a diagram of the components of an interactive user interface platform 109, according to one embodiment.

FIG. 2 is a diagram of the components of the interactive user interface platform 109, according to one embodiment. By way of example, the interactive user interface platform 109 includes one or more components for providing transition between one or more map representations. It is contemplated that the functions of these components may be combined in one or more components or performed by other components of equivalent functionality. In this embodiment, the interactive user interface platform 109 includes a processing module 201, a calculation module 203, a user interface module 205, and a presentation module 207.

In one embodiment, the processing module 201 generates at least one map route between a starting point and a destination. For example, the user may specify a destination and the current location of the user may be used to generate the at least one map route. In one embodiment, at least one map route may involve a spline representation.

In one embodiment, the processing module 201 functions with the presentation module 207 to present one or more map representations of the at least one map route, one or more map objects associated with the at least one map route, or a combination thereof in at least one user interface. As noted previously, the at least one map route may be represented as at least one spline representation in a 2D or a 3D space represented in the user interface. Examples of map elements include POIs, buildings, parks, landmarks, etc.

Figure 3:
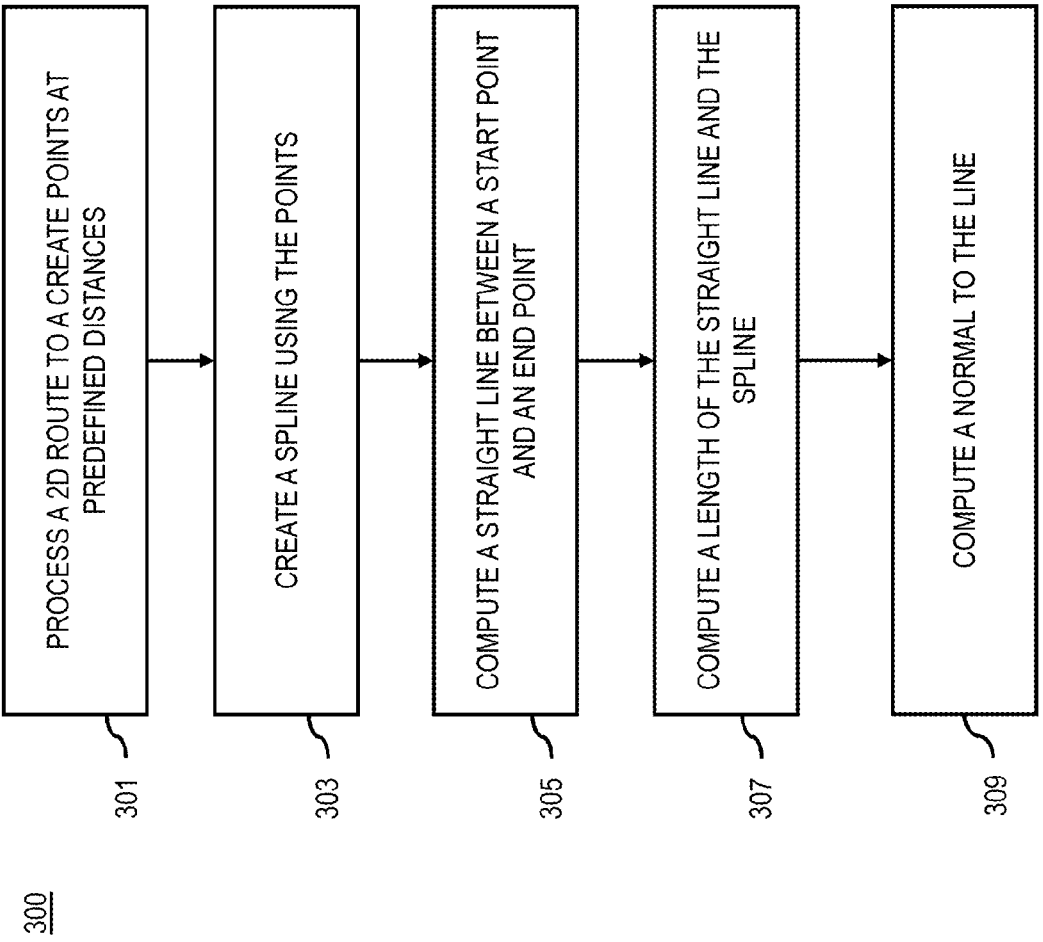
FIG. 3 illustrates a process for generating a spline route on a map, according to one embodiment.

In one embodiment, the calculation module 203 determines at least one straight-line representation of the at least one spline representation for the map route. Thereafter, the calculation module 203 transposes the one or more map representations from the at least one spline representation to the at least one straight-line representation, in one embodiment. As noted previously, the transposition may involve association of the map elements with the straight-line representation and spline representation. For example, location of a building on spline representation of the map route may be associated with a point on the straight-line representation, or vice versa. In one embodiment, the calculation module 203 may use the content repository 111 to store and query data associated with the location or points of the map elements for the straight-line representation and spline representation. In one embodiment, the calculation module 203 may apply one or more algorithms to generate the straight-line representation or the skyline representation. The algorithms may use multiple points that represent the map route and camera parameters (e.g., camera height and orientation) to generate the straight-line representation from spline representation, in an embodiment. For example, FIG. 3 illustrates a process for generating a spline route on the map, according to one embodiment. In one scenario, a 2D route is processed to create points at predefined distances, at process 301. For example, the predefined distance may be 7 meters. Therefore, multiple points are generated on the 2D route. Further, the spline includes a start point and an end point on the route. At process 303, a spline is created or generated by using the points created at the process 301. For example, the spline may be a Catmull-Rom spline that passes through one or more control points. In one embodiment, the spline may be a Bezier spline.

At process 305, a straight line is computed between the start point and the end point. Thereafter, length of the line and the spline is computed at the process 307. For example, the length of the line may be computed by calculating the absolute measure of a distance vector between the start point and the end point. The length of the spline may be computed, for example, by summing the distance between the control points or interpolating between the spline control points and summing the distances. Further, a normal to the line may be computed at the process 309.

Figure 4:
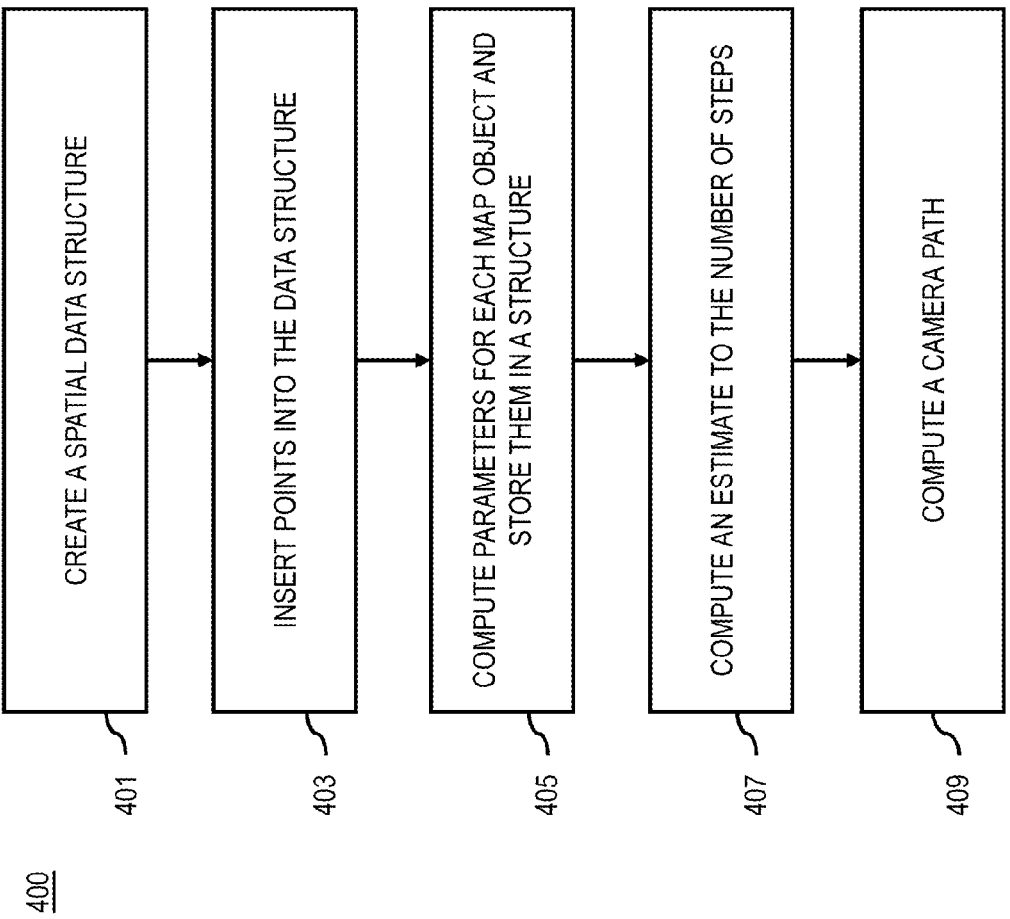
FIG. 4 illustrates a process for transposing a spline representation to a straight-line representation, according to one embodiment.

FIG. 4 illustrates a process for transposing the spline representation to the straight-line representation, according to one embodiment. In one scenario, the process 400 may be used to move map objects from the spline representation to the straight-line representation. At process 401, a spatial data structure is generated. For example, the data structure may be a k-dimensional (KD) tree. Thereafter, at process 403, the control points on the spline (as generated in process 300) are inserted in the data structure. Further, the points (as generated in the process 300) are associated with an index of the control points.

In one scenario, at process 405, object parameters for each map object are computed and store in an object data structure. For example, the object parameters include centroid of the point of the object, an index of the object, an absolute distance between the object point and the point nearest to it in the KD tree, an offset distance between the object point and the point nearest to it in the KD tree.

In one scenario, as estimate of the number of steps required to transition from the spline representation to straight-line representation is computed, at process 407. For example, the number of steps may be estimated based on the distance of a point between its current position (e.g., in spline representation) and a final position (e.g., straight-line representation). In one embodiment, a maximum distance is selected and divided by a predefined step value to compute the number of steps. By way of example, if it is determined that the maximum distance that a point will be moved is 2 meters and the predefined step value is 0.5, then the number of steps can be computed as 4 (i.e., 2 divided by 0.5). Further, other values or parameters such as increment in length of a line, a bisector of the original path may be computed at process 407.

In one scenario, a camera path is computed at process 409. In one embodiment, the camera path may be calculated so that the camera position for each step (computed in process 407) can be determined. By way of example, if the height of the camera is 60 in the spline representation and the number of steps is 4, then the camera path may be defined per step as 60 to 45, 45 to 30, 30 to 15, and 15 to 0. In one scenario, the final camera position to present the straight-line representation may be defined as a normal along the straight line (as computed in the process 300).

Returning back to FIG. 2, in one embodiment, the presentation module 207 generates one or more transition animations to show at least one transition from the at least one spline representation to the at least one straight-line representation. Further, the presentation module 207 presents the transition animations on the user interface. As noted previously, the transition animation includes a flattening of the spline representation into the straight-line representation. For example, FIG. 5 illustrates the process for presenting the transition animation on the user interface. As noted previously, the transition animation includes flattening of the spline representation, which is determined with respect to the center point of the spline representation. For example, the center point may be a bisector of the original path or route in the spline representation.

In one scenario, the transition animation is performed in the number of steps (for example, as computed in process 300) to display a transition from the spline representation to straight-line representation. At process 501, the line generated between the end points is extended on either sides of the center point. For example, one or more new points are computed for the points computed for the spline (e.g., at process 300) based on the number of steps and the predefine step value.

At process 503, a current spline is updated based on the new points computed at process 501. In one scenario, the current spline is updated based on the calculation of updated control points. For example, the new control points may be generated by computing distance between the new points (as computed in process 501) and the current control points. In one scenario, the new control points are computed at every step to generate the transition.

Figure 6A:
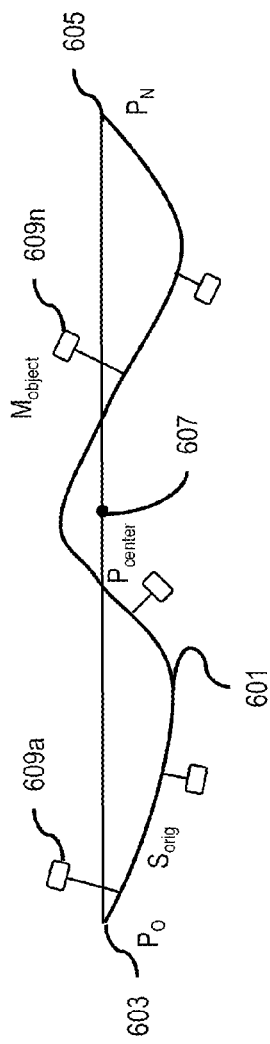
FIGS. 6A-6D illustrate an exemplary transition of the spline representation into straight-line representation, according to one embodiment.
Figure 6B:
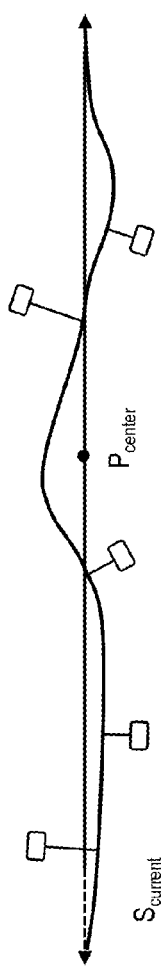
Figure 6C:
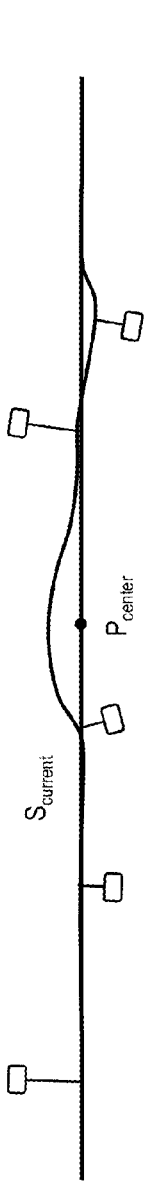
Figure 6D:
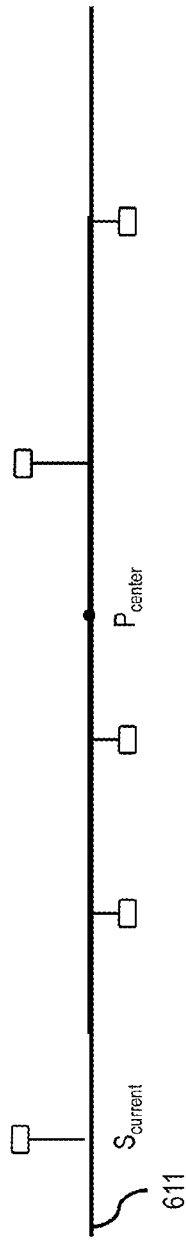

At process 505, the map objects are updated to align with the current spline. In one scenario, the points associated with the map objects from the object database are translated to updated points for the current spline. For example, the new map object may be determined by adding an offset distance associated with the map object (e.g., retrieved from the object database) to the location of the current control point (i.e., the control associated with the map object). The alignment may relate to a rotation of the map object, so that the map object is positioned normal to the current spline. FIGS. 6A-6D illustrate an exemplary transition of the spline representation into straight-line representation, according to one embodiment. As shown in FIG. 6A, a spline $S_{orig}$ 601 may be a map route between an end point $P_O$ 603 and an end point $P_N$ 605. Further, a center point $P_{center}$ 607 may be a bisector of the spline $S_{orig}$ 601. The spline $S_{orig}$ 601 may include elements or objects $M_{object}$ 609a-n. For example, the $M_{object}$ 609a-n may relate to POIs, parks, building footprints, landmarks, etc. As can be seen from the FIGS. 6A to 6D the spline $S_{orig}$ 601 is flattened into a straight-line representation $S_{current}$ 611 in the FIG. 6D through intermediate steps in FIGS. 6B and 6C. It is noted that the flattening of spline representation to straight-line representation shown in the FIGS. 6A-6D is exemplary and multiple steps or processes may be involved that are not shown for sake of simplicity.

Returning back to FIG. 2, the presentation module 207 may present the multiple routes as stacked representation of multiple straight-line representations, in one embodiment. The stacked representation is illustrated with reference to FIG. 16. In one embodiment, the presentation module 207 presents the straight-line representation in a first window and the spline representation in a second window on the user interface. The window representation is illustrated with reference to FIG. 17. In one embodiment, if presentation module 207 determines at least one interaction with respect to the straight-line representation, then a corresponding interaction with the spline representation is caused. In another embodiment, if the presentation module 207 determines at least one interaction with respect to the straight-line representation, then a corresponding interaction with the spline representation is caused. By way of example, when the user pans the spline representation in the first window, accordingly, the presentation module 207 causes panning of the straight-line representation in the second window (and vice versa).

Figure 7:
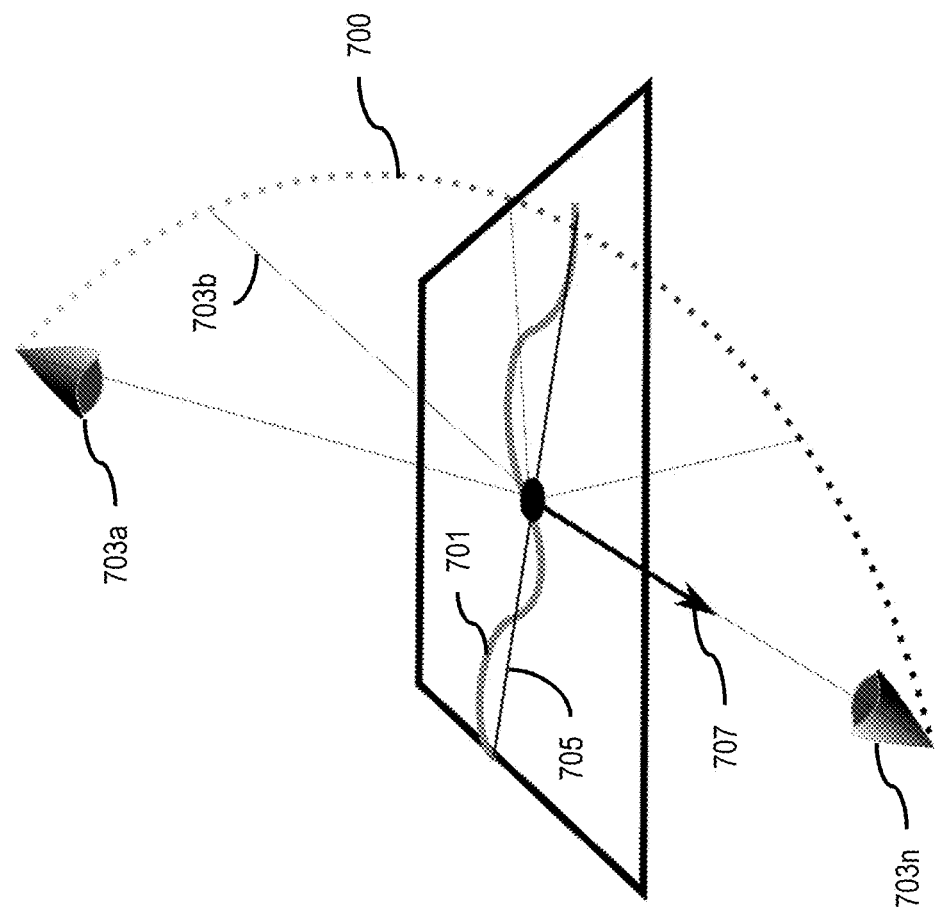
FIG. 7 illustrates an exemplary camera path during transition from the spline representation to straight-line representation, according to one embodiment.

In one embodiment, the presentation module 207 determines the first camera position associated with the spline representation and the second camera position associated with the straight-line representation. As noted previously, the transition animation may therefore include transitioning from the first camera position to the second camera position, in one embodiment. FIG. 7 illustrates an exemplary camera path 700 during transition from the spline representation to straight-line representation, according to one embodiment. As shown, the path is displayed as a spline 701 from a camera position 703a and as a line 705 from the camera position 703n. In one embodiment, the camera position 703a is along a normal 707 to the line 705. Further, as shown, the camera position may change from a position 705a to 705n over the path 700. As noted previously, the camera path 700 is computed by the calculation module 203 as discussed in the process 400 of FIG. 4.

In one embodiment, the presentation module 207 maintains one or more interactive user interface elements during the transition from the spline representation to the straight-line representation. As noted previously, the interactive user interface elements include map elements or objects that can be interacted with by through the user interface, such as points on the route that can be selected or dragged by the user.

In one embodiment, the user interface module 205 may be configured for exchanging information between UE 101 and the content repository 111, and/or one or more third-party content providers. In another embodiment, the user interface module 205 enables presentation of a graphical user interface (GUI) for displaying map images with content information in connection to a selected object model. For example, the user interface module 205 executes a GUI application configured to provide users with a transition between map representations. The user interface module 205 employs various application programming interfaces (APIs) or other function calls corresponding to the applications 103 of UE 101, thus enabling the display of graphics primitives such as menus, buttons, data entry fields, etc., for generating the user interface elements. Still further, the user interface module 205 may be configured to operate in connection with augmented reality (AR) processing techniques, wherein various different applications, graphic elements and features may interact. For example, the user interface module 205 may coordinate the presentation of augmented reality map images in conjunction with content information for a given location or in response to a selected route or map representation.

Figure 8:
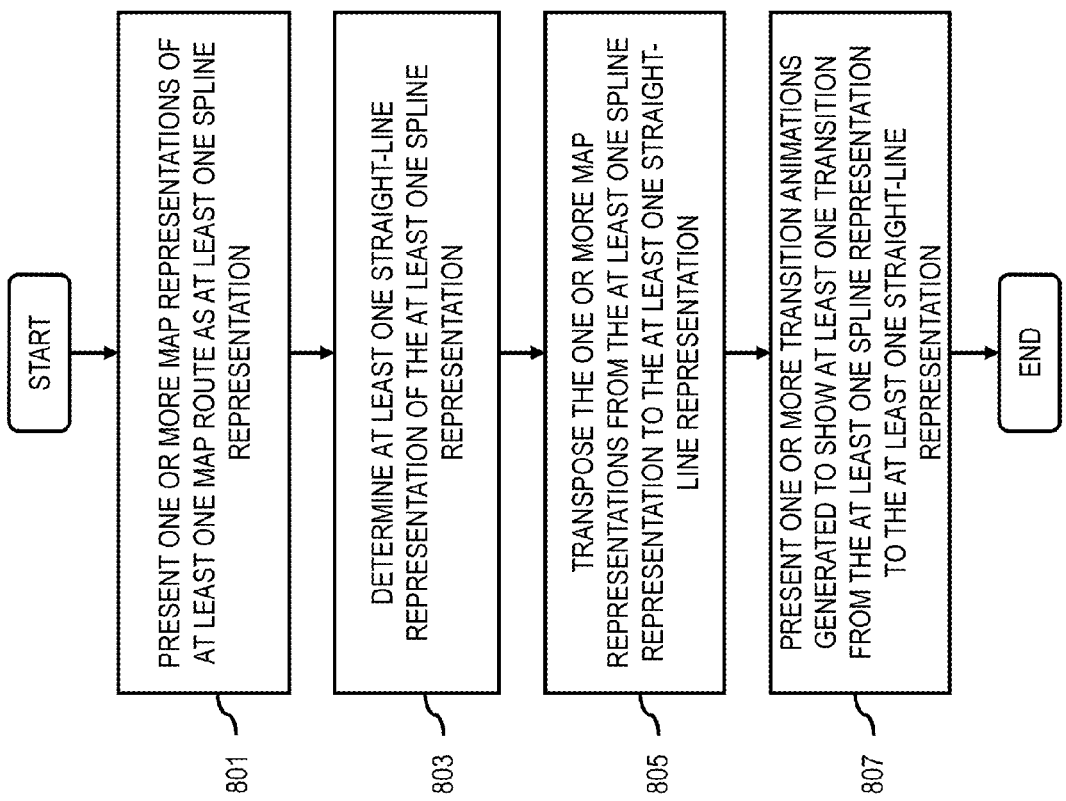
FIG. 8 is a flowchart of a process for providing transitions between the map representations, according to one embodiment.
Figure 19:
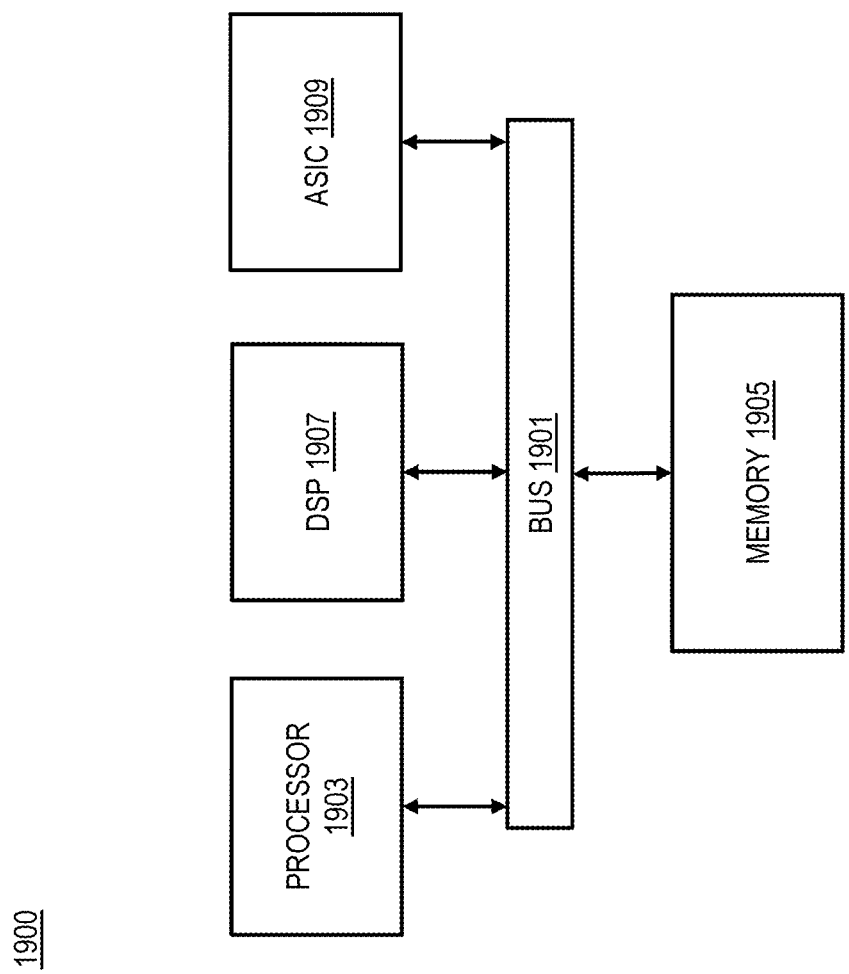
FIG. 19 is a diagram of a chip set that can be used to implement an embodiment of the invention.

FIG. 8 is a flowchart of a process for providing transitions between the map representations, according to one embodiment. In one embodiment, the interactive user interface platform 109 performs the process 800 and is implemented in, for instance, a chip set including a processor and a memory as shown in FIG. 19. In addition or alternatively, the applications 103 may perform all or a portion of the process 800.

In step 801, the interactive user interface platform 109 causes presentation of one or more map representations of at least one map route, one or more map objects associated with the at least one map route, or a combination thereof in at least one user interface. As noted previously, the at least one map route is represented as at least one spline representation in a two-dimensional or a three-dimensional space represented in the at least one user interface. Thereafter, in step 803, the interactive user interface platform 109 determines at least one straight-line representation of the at least one spline representation. As noted previously, the straight-line representation may include one or more points or map objects associated with the spline representation.

In step 805, the interactive user interface platform 109 causes, at least in part, a transposition of the one or more map representations from the at least one spline representation to the at least one straight-line representation. As noted previously, the transposition may include transposition of the one or more points and the one or more map objects on the spline representation to the straight-line representation.

In step 807, the interactive user interface platform 109 causes, at least in part, a presentation of one or more transition animations generated to show at least one transition from the at least one spline representation to the at least one straight-line representation. For example, the animation may include flattening of the spline representation to the straight-line representation.

Figure 9:
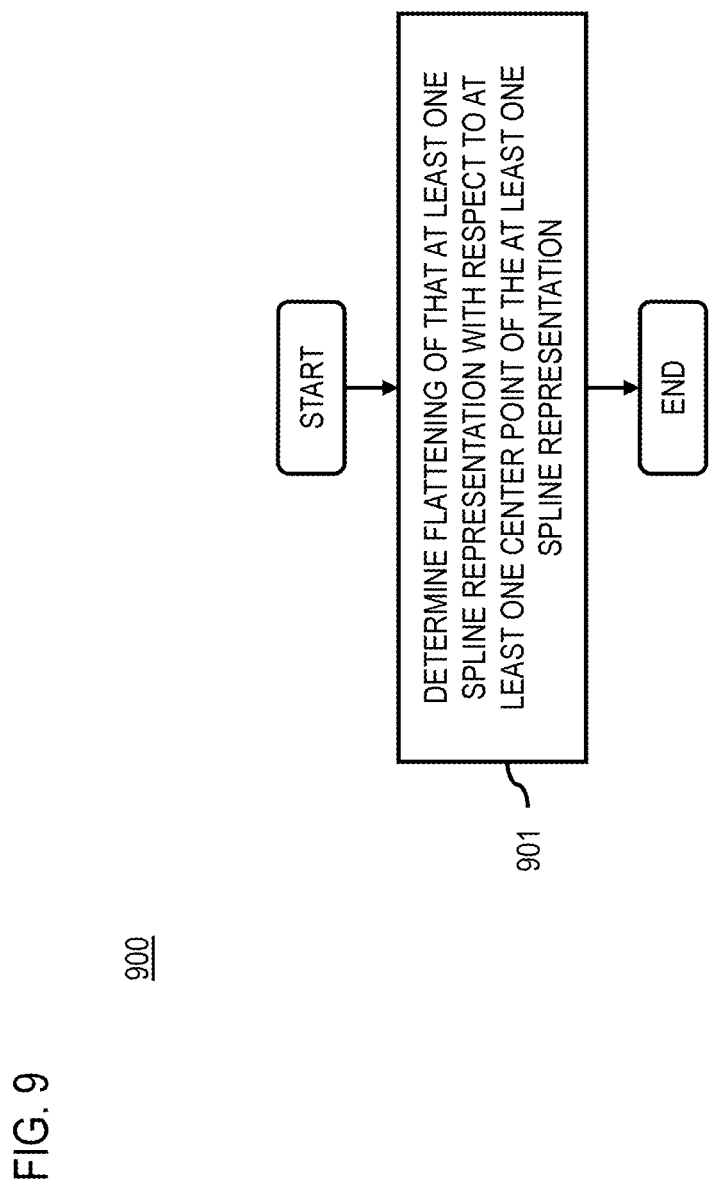
FIG. 9 is a flowchart of a process for flattening the spline representation to straight-line representation, according to one embodiment.

FIG. 9 is a flowchart of a process for flattening the spline representation to straight-line representation, according to one embodiment. In one embodiment, the interactive user interface platform 109 performs the process 900 and is implemented in, for instance, a chip set including a processor and a memory as shown in FIG. 19. In addition or alternatively, the applications 103 may perform all or a portion of the process 900.

In one embodiment, the at least one transition animation includes, at least in part, a flattening of the at least one spline representation into the at least one straight-line representation. In one embodiment, the interactive user interface platform 109 determines the flattening of the at least one spline representation with respect to at least one center point of the at least one spline representation. For example, the center point may be a bisector of the original path or route in the spline representation. An exemplary flattening of the spline is explained in FIGS. 6A-6D.

Figure 10:
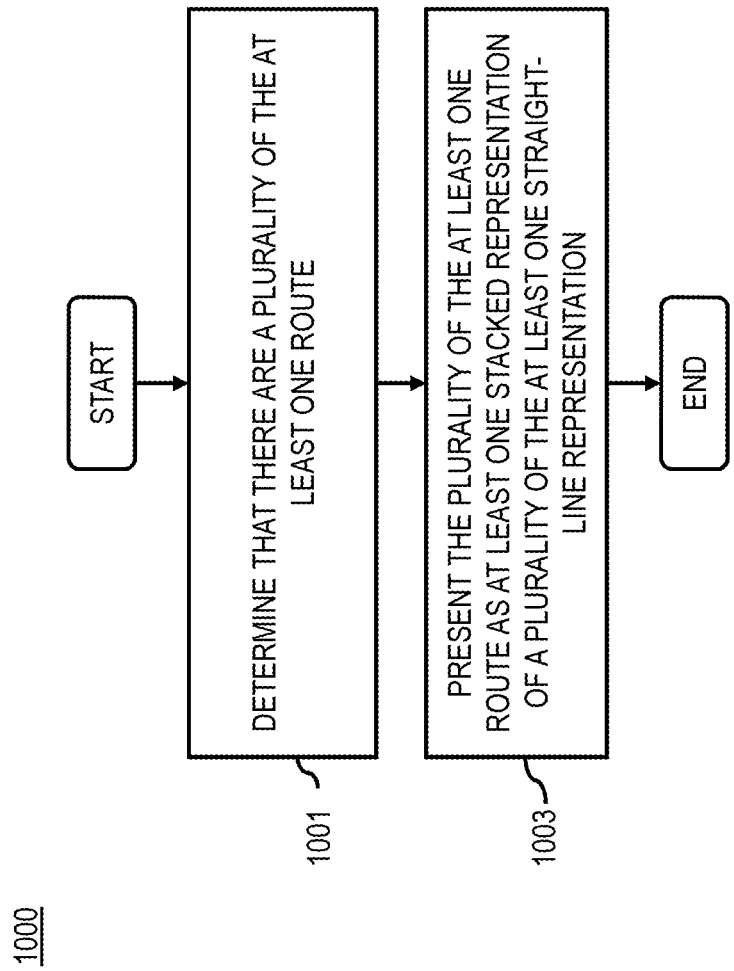
FIG. 10 is a flowchart of a process for presenting a stacked representation of the map routes, according to one embodiment.

FIG. 10 is a flowchart of a process for presenting a stacked representation of the map routes, according to one embodiment. In one embodiment, the interactive user interface platform 109 performs the process 1000 and is implemented in, for instance, a chip set including a processor and a memory as shown in FIG. 19. In addition or alternatively, the applications 103 may perform all or a portion of the process 1000.

In step 1001, the interactive user interface platform 109 determines that there are a plurality of the at least one route. Subsequently, in step 1003, the interactive user interface platform 109 causes, at least in part, a presentation of the plurality of the at least one route as at least one stacked representation of a plurality of the at least one straight-line representation. An exemplary stacked representation is illustrated with reference to FIG. 16. Therefore, the interactive user interface platform 109 enables the user to view multiple map representations on the user interface, making it simpler to navigate and associate the different representations. Further, the user can browse through the stacked representations. For example, the user may pan one of a staked skyline representation to view the route.

Figure 11:
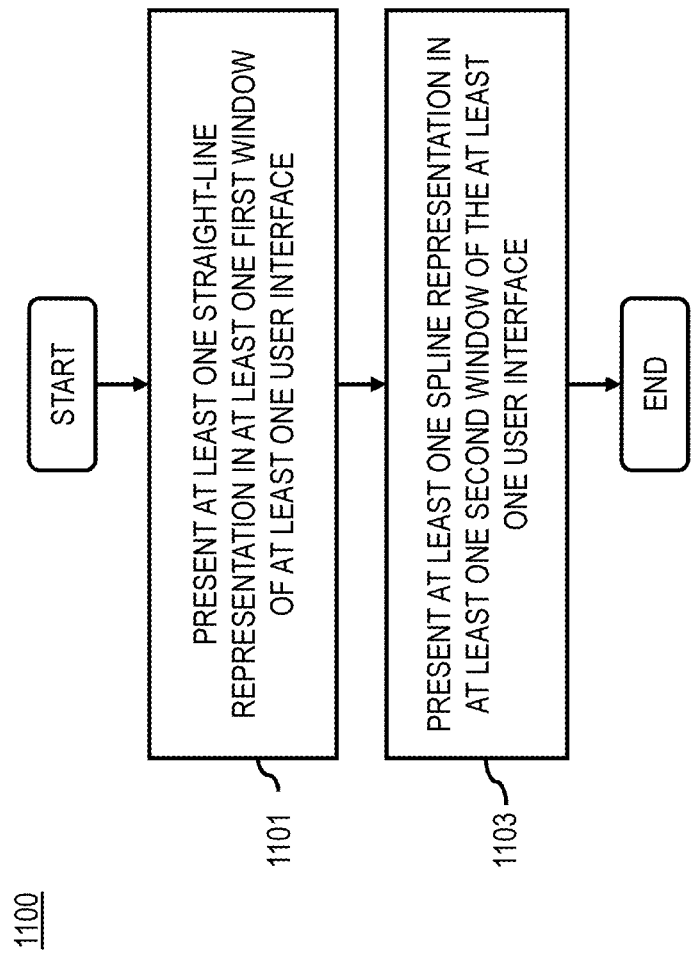
FIG. 11 is a flowchart of a process for presenting plurality of map representations in separate windows in a user interface, according to one embodiment.

FIG. 11 is a flowchart of a process for presenting plurality of map representations in separate windows in a user interface, according to one embodiment. In one embodiment, the interactive user interface platform 109 performs the process 1100 and is implemented in, for instance, a chip set including a processor and a memory as shown in FIG. 19. In addition or alternatively, the applications 103 may perform all or a portion of the process 1100.

As noted previously, the map representations include a spline representation and a straight-line representation. By way of example, a user may desire to see both the spline representation and straight-line representation on the user interface. In step 1101, the interactive user interface platform 109 causes, at least in part, a presentation of the at least one straight-line representation in at least one first window of the at least one user interface.

In step 1103, the interactive user interface platform 109 causes, at least in part, a presentation of the at least one spline representation in at least one second window of the at least one user interface. For example, the user interface may be divided into the two windows horizontally or vertically for displaying the representations. The window representation is illustrated with reference to FIG. 17.

Figure 12:
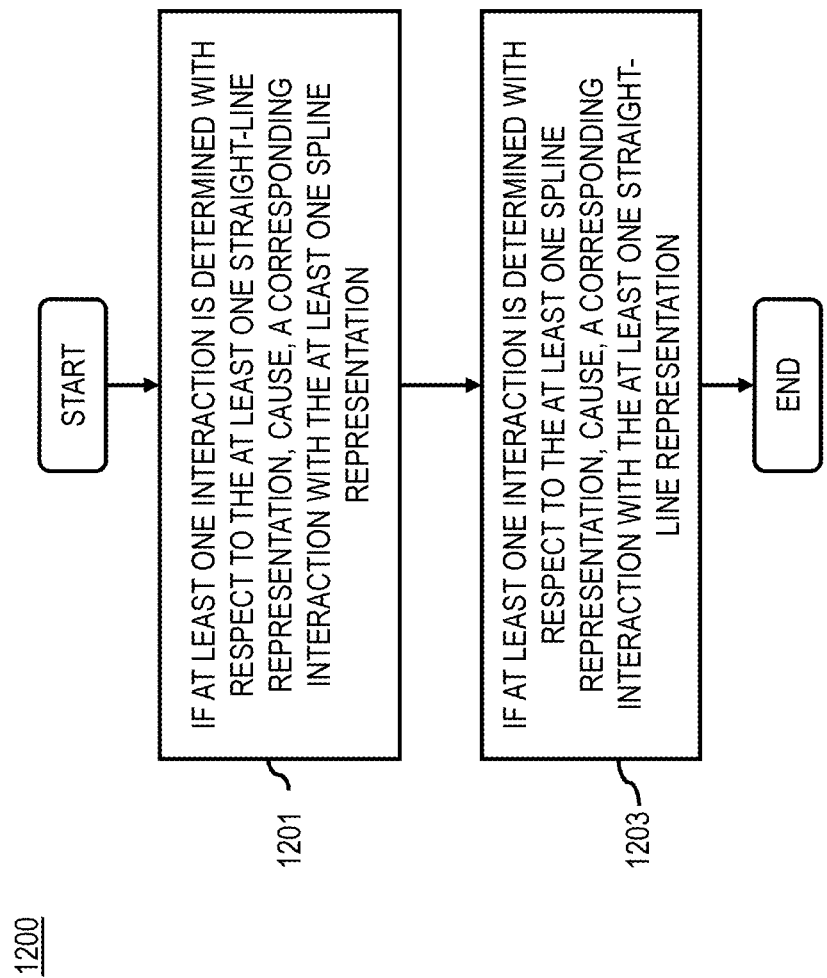
FIG. 12 is a flowchart of a process for interacting with the map representations in a user interface, according to one embodiment.

FIG. 12 is a flowchart of a process for interacting with the map representations in a user interface, according to one embodiment. In one embodiment, the interactive user interface platform 109 performs the process 1200 and is implemented in, for instance, a chip set including a processor and a memory as shown in FIG. 19. In addition or alternatively, the applications 103 may perform all or a portion of the process 1200.

As noted previously, plurality of map representations may be displayed on the user interface (e.g., in separate windows). By way of example, the user may interact with the one or more representations to understand the map, location, or the environment.

In step 1201, if at least one interaction is determined with respect to the at least one straight-line representation, then the interactive user interface platform 109 causes, at least in part, a corresponding interaction with the at least one spline representation. For example, the interaction may include gestures for panning, zooming, shrinking, etc.

In step 1203, if at least one interaction is determined with respect to the at least one spline representation, then the interactive user interface platform 109 causes, at least in part, a corresponding interaction with the at least one straight-line representation. By way of example, when the user pans the spline representation in the first window, accordingly, the interactive user interface platform 109 causes panning of the straight-line representation in the second window (and vice versa).

Figure 13:
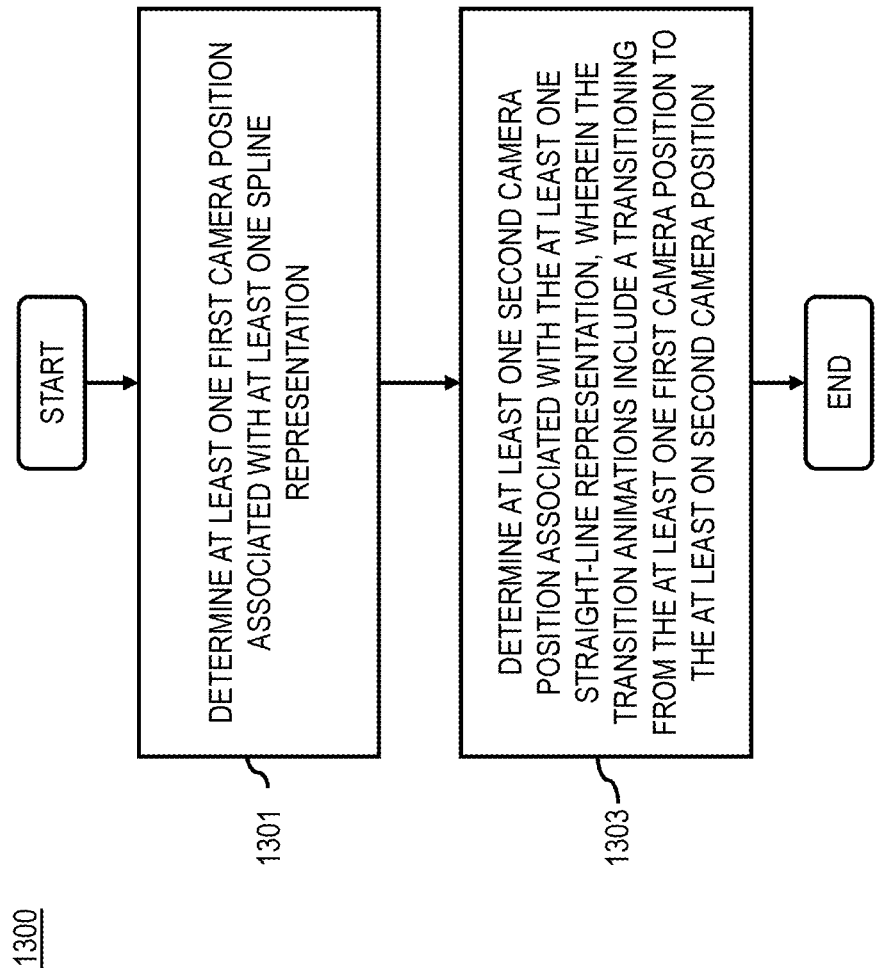
FIG. 13 is a flowchart of a process for determining camera positions for presenting the transitions, according to one embodiment.

FIG. 13 is a flowchart of a process for determining camera positions for presenting the transitions, according to one embodiment. In one embodiment, the interactive user interface platform 109 performs the process 1300 and is implemented in, for instance, a chip set including a processor and a memory as shown in FIG. 19. In addition or alternatively, the applications 103 may perform all or a portion of the process 1300.

In step 1301, the interactive user interface platform 109 determines at least one first camera position associated with the at least one spline representation. In one embodiment, the first camera position may be determined based on the user's viewpoint of the map. For example, the camera position may be at a predefined height from the plane of the route. In one embodiment, the camera position may be manipulated on defined by the user on the user interface.

In step 1303, the interactive user interface platform 109 determines at least one second camera position associated with the at least one straight-line representation. As noted previously, the second camera position may be along the plane or normal to the straight line generated by the interactive user interface platform 109. In one embodiment, the one or more transition animations include a transitioning from the at least one first camera position to the at least on second camera position. The exemplary camera path is explained in conjunction with FIG. 7.

Figure 14:
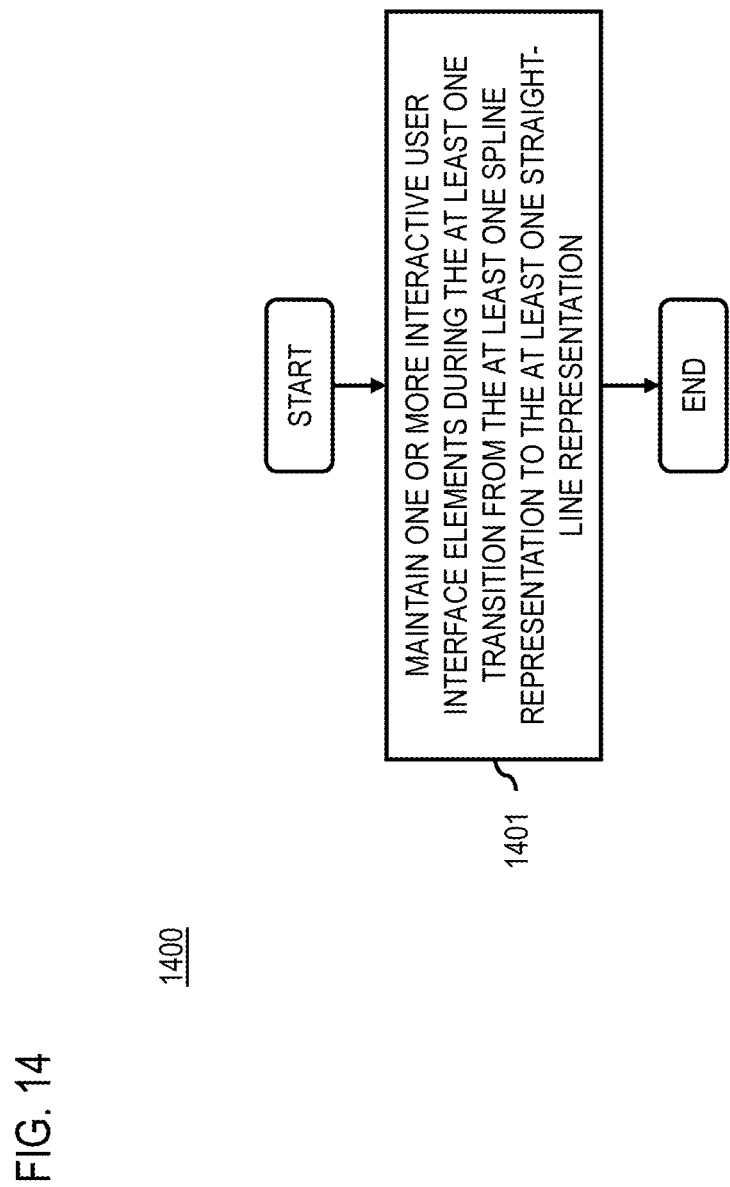
FIG. 14 is a flowchart of a process for maintaining interactive interface elements during the transition, according to one embodiment.

FIG. 14 is a flowchart of a process for maintaining interactive interface elements during the transition, according to one embodiment. In one embodiment, the interactive user interface platform 109 performs the process 1400 and is implemented in, for instance, a chip set including a processor and a memory as shown in FIG. 19. In addition or alternatively, the applications 103 may perform all or a portion of the process 1400.

As noted previously, the one or more map representations include, at least in part, one or more interactive user interface elements. For example, the interactive user interface elements include points on the route that can be selected or dragged by the user, controls such for zooming, building footprints, or POIs etc.

In step 1401, the interactive user interface platform 109 maintains the one or more interactive user interface elements during the at least one transition from the at least one spline representation to the at least one straight-line representation.

In one embodiment, the user can interact with the interactive user interface elements during and after the transitions. For example, the user can perform manipulation through gestures (e.g. tap, pinch, spread etc.) on the map representations.

Figure 15:
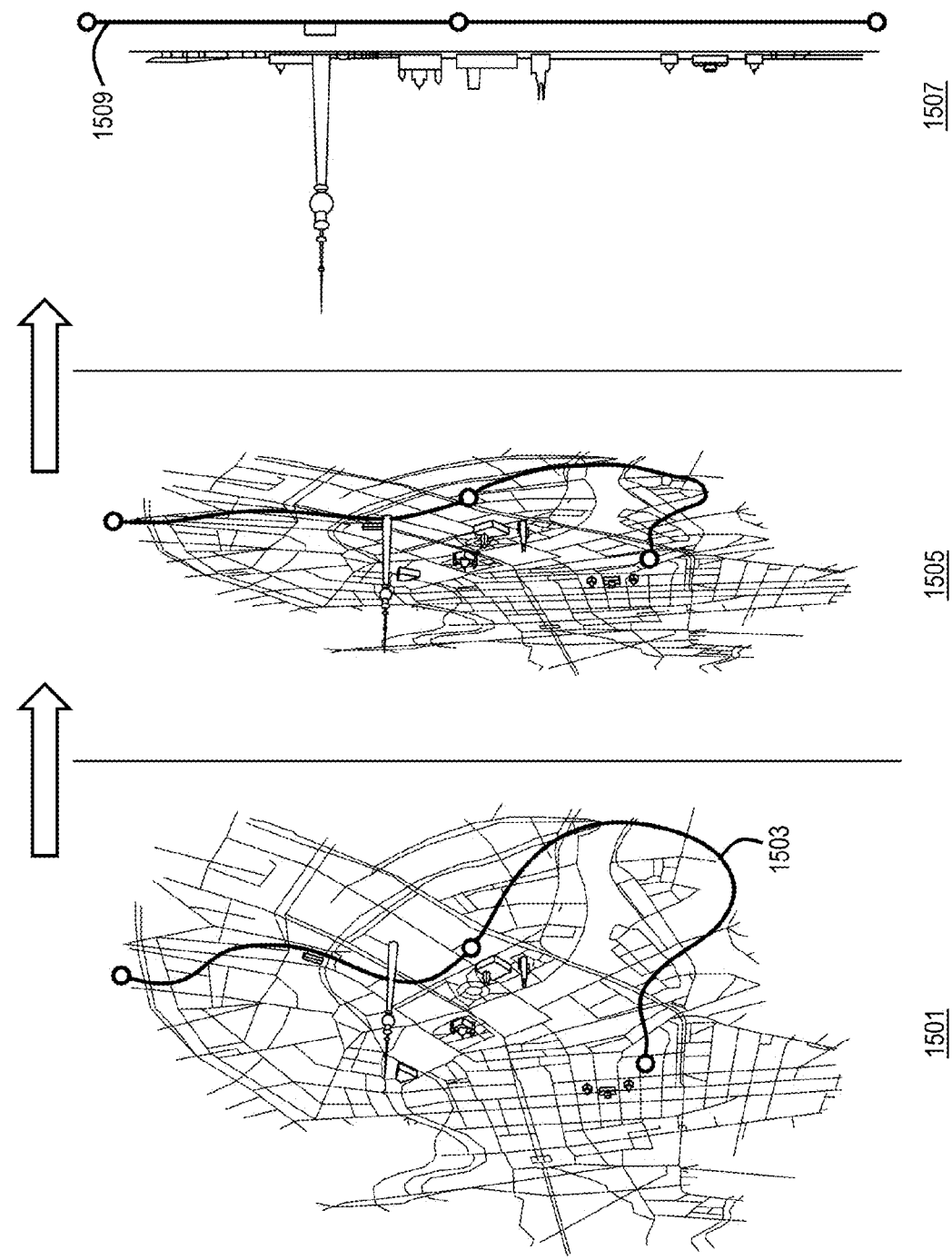
FIG. 15 illustrates a transition from the spline representation to straight-line representation, according to one embodiment.

FIG. 15 illustrates a transition from the spline representation to straight-line representation, according to one embodiment. As shown, the spline representation 1501 is a 2D/3D view of a map. The representation 1501 illustrates the route as a spline 1503. The representation 1501 transitions through intermediate representation 1505 to the straight-line representation or a skyline representation 1507. As shown, the skyline representation 1507 illustrates the route as a straight line 1509.

Figure 16:
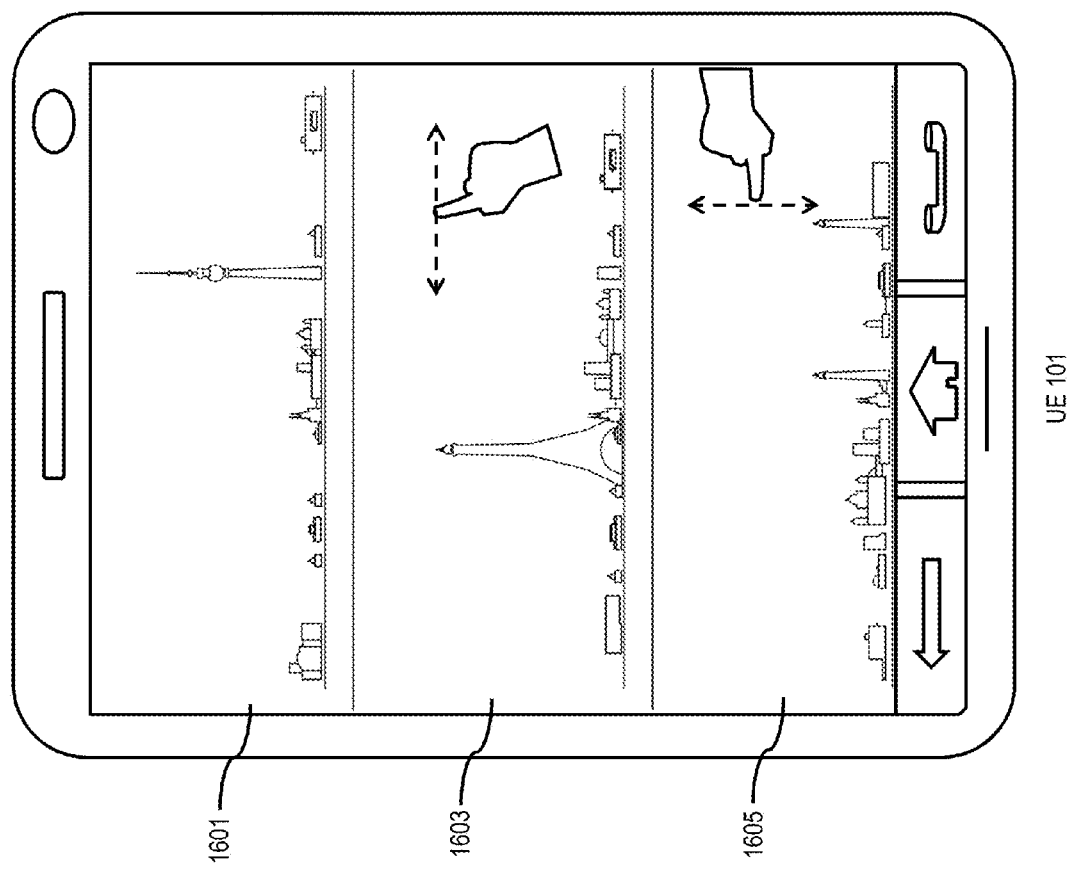
FIG. 16 illustrates a stacked representation on a user interface as generated in the processes of FIGS. 8-14, according to one embodiment.

FIG. 16 illustrates a stacked representation on a user interface as generated in the processes of FIGS. 8-14, according to one embodiment. As shown, straight-line representation or skyline representations 1601, 1603, and 1605 corresponding to different routes may be displayed as stacked on each other on a user interface of the UE 101. In one embodiment, the user can interact with the representations to browse through them. For example, the user can pan the representations horizontally to view the route. Further, the user can pan the representations vertically to view other representations or route displayed on the user interface. Although not shown, the user can zoom in or zoom-out of the representation, create annotations, or perform other manipulations, for example through gestures. As noted previously, the stacked representation may be generated by the interactive user interface platform 109. In one embodiment, the algorithm for implementing the skyline view is based on spline smoothing and interpolation. It requires minimal computation and can be done on a variety of devices and embedded systems. In detail the algorithm proceeds as follows:

Input:
List of points representing a route, sketch or other such linear sequence representing a path through a map.
Current 3D camera height and orientation.

Parameters:
x: meter spacing of line (default 1 meter)
stepValue: step value of spline points towards final line position Procedure:
Pre-processing:
1. Subsample the 2D route to create points every x meters (where x is a parameter to the algorithm) and call the path $P_{orig}$ set $N_{points}$ to be the number of points of $P_{orig}$.
2. Create a spline $S_{orig}$ using the points from path $P_{orig}$. The spline can be either Bezier or Catmull-Rom, although Catmull-Rom is preferred as the points will pass through the control points.
3. Compute a 2D straight line $L_s$ between the first point $P_0$ and the end point $P_N$ of the path $P_{orig}$.
4. Compute the vector $\vec{V_s}$ (as $V_s = P_N - P_0$)
5. Compute the length of $L_s$ call it $Len_{orig} = \|\vec{V_s}\|$
6. Compute the length of $S_{orig}$ call it $SLen_{orig}$. This can be done be summing the distance between the control points or interpolating between the spline control points and summing those distances.
7. Compute the normal $\vec{Nl}$ to the line.

In one embodiment, the interactive user interface platform 109 may perform the following steps to move 2D/3D map elements (such as POIs, landmarks, parks, building footprint, etc.):

8. Create a spatial data structure, such as a KD tree, call it T
9. Insert each control point of $S_{orig}$ into T associating its index with the point (the reason for the sub-sampling in step 1 above)
10. For each map element $M_{element}$ do:
   a. Compute centroid of $M_{element}$ (or pick another point) call it $P_{element}$
   b. Obtain the index, idx of the point on $S_{orig}$, (call it $P_{spline}$), by querying T for the closest point to $P_{element}$
   c. Compute the normal $\vec{N_{element}}$ between $P_{element}$ and $P_{spline}$ (i.e. $\vec{N_{element}} = \|P_{element} - P_{spline}\|$)
   d. Also compute the offset $O_{element} = P_{element} - P_{spline}$
   e. Create a structure called Einfo, store the following:
      $O_{element}$
      $N_{element}$
      Idx
      $M_{element}$
11. Store Einfo into array, list, database, etc. into (for this insert into list MInfo)
12. Compute an estimate to the number of steps need $N_{steps}$ (see discussion below)
13. Set the current line length $L_{current} = Len_{orig}$
14. Compute increment for line length $\Delta Line = (SLen_{orig} - Len_{orig})/N_{steps}$
15. Compute bisector of $P_{orig}$ call it $P_{center}$
16. Set current spline $S_{current} = S_{orig}$
17. Compute camera path $Path_{Camera}$ so that it camera position can be computed for each step between 0 and $N_{steps}$ moving from its current position to height=0 and looking at $P_{center}$ In one embodiment, once the above pre-processing steps have been completed, the interactive user interface platform 109 may initiate animation. Although a number of steps have to be executed for pre-processing, as the number of steps and map elements are usually quite small, it will take minimal time to execute (e.g., less than 0.1 second on average). In one embodiment, the algorithm is designed to step once each time until the spline is mapped to the line and the camera is at the height=0 looking at $P_{center}$ along $\vec{Nl}$.

For each step i in range [0 to $N_{steps}$] do:
1. Create an empty array of points, call it $L_{new}$
2. Compute $\Delta Step = L_{current}/N_{points}$
3. To grow the line on either end of the center point (see FIG. 1):
   For j=-$N_{points}/2$ to $N_{points}/2$ do:
   a. pt=$P_{center}$ $\vec{V_s}$*(j*$\Delta Step$)
   b. Add point to $L_{new}$ In one embodiment, to update the spline $S_{current}$ (in effect flattening it to a line), the interactive user interface platform 109 may perform the following steps:
1. Create temporary list of points $L_{tmp}$
2. For each control point Ps in $S_{current}$, indexed by i:
   a. Compute normalized vector $\vec{n}$ between $L_{new}$ and $S_{current}$
   b. Compute distance d
   c. If (d>minD): // still not at final position
      Create point P=Ps+$\vec{n}$*d/stepValue (stepValue can be a parameter, default is 10.0)
      else: // close enough so snap to final position
      P=$L_{new}$[i]
   d. Insert P into $L_{tmp}$
3. Clear $S_{current}$
4. Insert all points in $L_{tmp}$ as control points to $S_{current}$ In one embodiment, the interactive user interface platform 109 may update all the MapElements by performing the following steps:

For all Einfo in MInfo:
a. idx=Einfo.idx;
b. pt=$S_{current}$[idx]+Einfo.offset // get the current location of the control point of spline and add offset
c. translate Einfo. $M_{element}$ to pt
d. Align (i.e. rotate) the element to align with normal from $S_{current}$[idx] to pt In one embodiment, the interactive user interface platform 109 may update the camera by computing camera position (e.g., standard camera interpolation options can be applied), where one such method is shown in FIG. 7. The final position of the camera should be at height=0 and aligned with $\vec{Nl}$. (normal to the line).

In one embodiment, after $N_{steps}$, the animation is completed. As the number of total steps to converge to a solution is not known, a metric can be computed to estimate $N_{step}$ which reduces this ambiguity. One metric used is finding the maximum distance SMaxD from the most distance point in the original spline $S_{orig}$ to its final position. Once computed the number of steps is estimated to be:

$$N_{steps}=SMaxD/\text{stepValue}$$

This metric is usually accurate with at most 10% error. Another method which would be more accurate would be to simply run the computation once before it's is animated which would compute $N_{step}$ directly. Finally, the machine learning could be used to build a prediction function for $N_{step}$ based on the input spline and distance.

Figure 17:
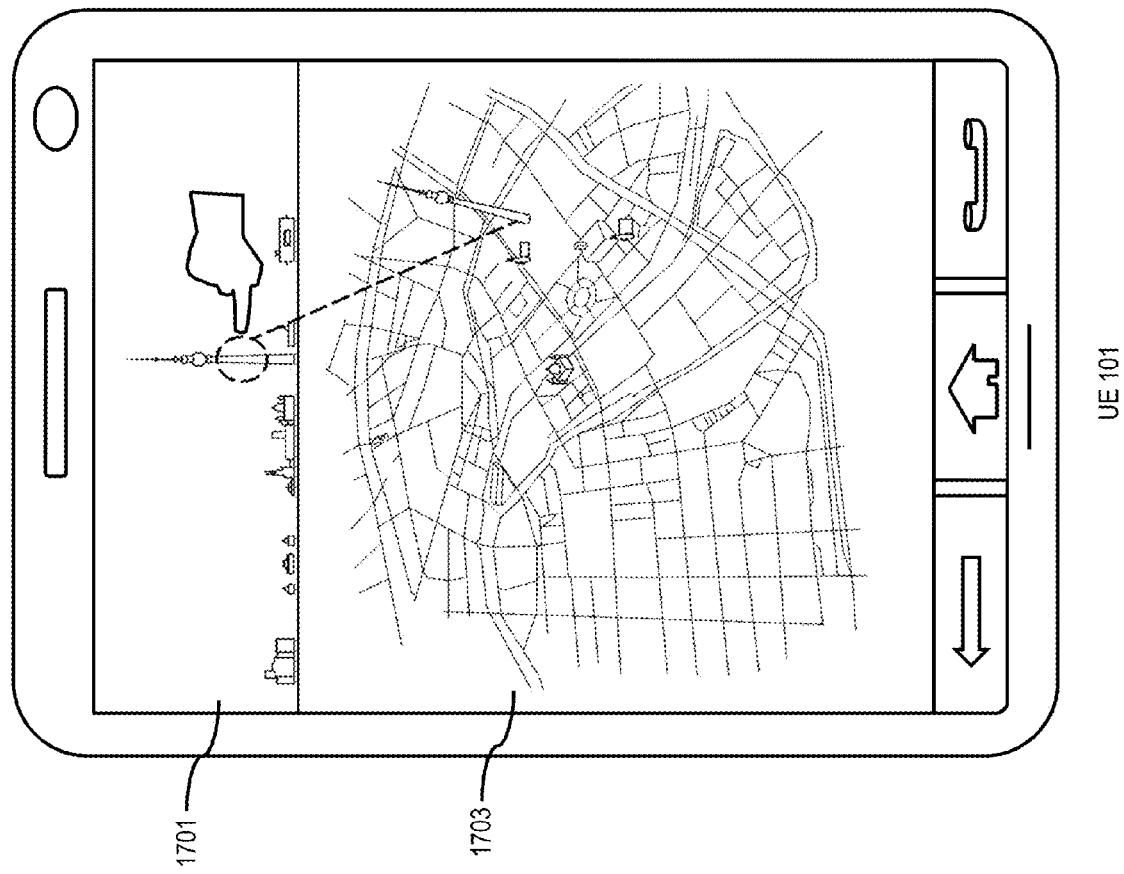
FIG. 17 illustrates a combined representation on a user interface as generated in the processes of FIGS. 8-14, according to one embodiment.

FIG. 17 illustrates a combined representation on a user interface as generated in the processes of FIGS. 8-14, according to one embodiment. As shown, the user interface presented on the UE 101 includes a straight-line representation 1701 and a corresponding spline representation 1703.

In one embodiment, an interaction performed by the user (e.g., tap, select, pinch, zoom etc.) on the straight-line representation 1701, causes a corresponding interaction with the spline representation 1703. For example, as shown, a tapping by the user on a building in the straight-line representation 1701 zooms to the corresponding building in the spline representation 1703. Similarly, an interaction with the spline representation 1703 may cause corresponding changes in the straight-line representation 1701.

The processes described herein for providing transitions between map representations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 18:
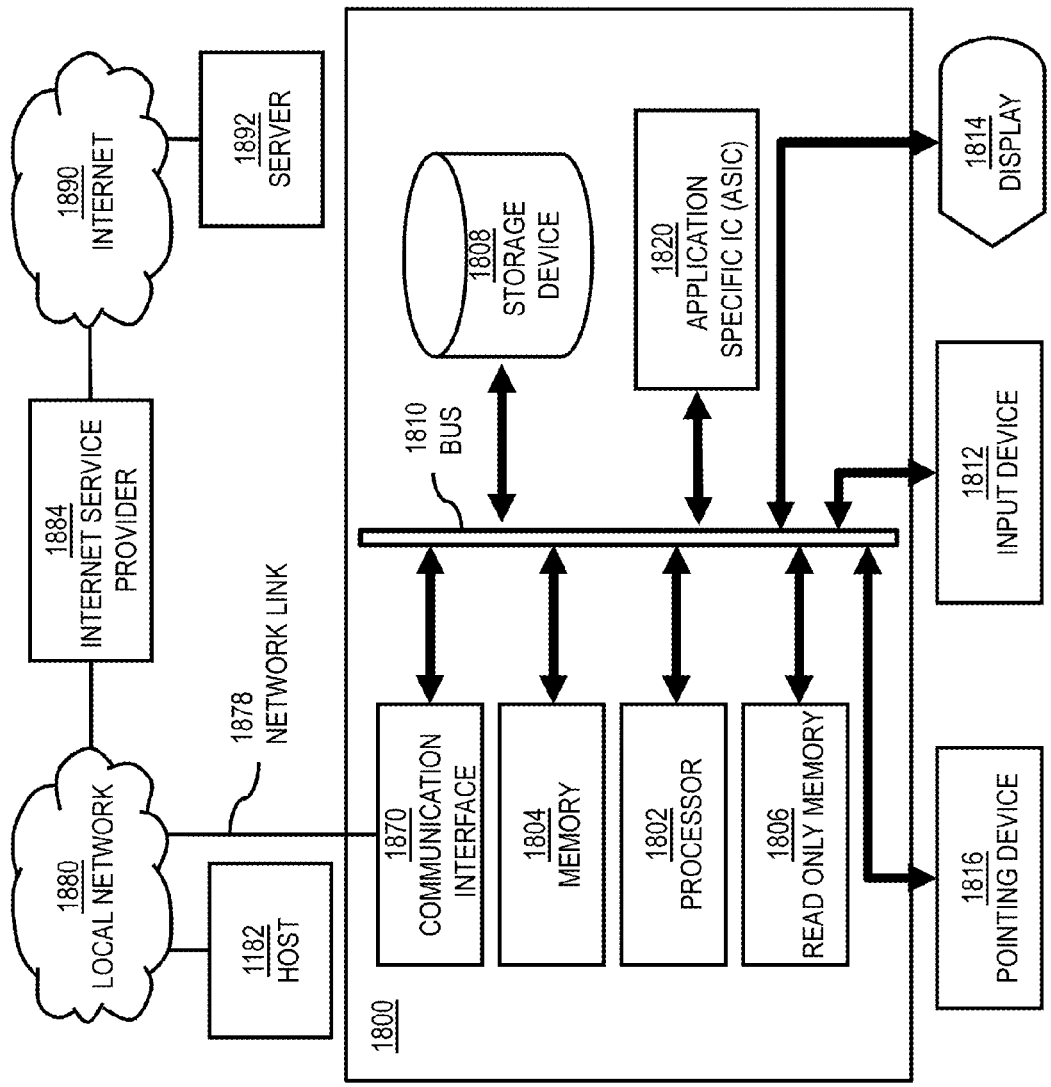
FIG. 18 is a diagram of hardware that can be used to implement an embodiment of the invention.

FIG. 18 illustrates a computer system 1800 upon which an embodiment of the invention may be implemented. Although computer system 1800 is depicted with respect to a particular device or equipment, it is contemplated that other devices or equipment (e.g., network elements, servers, etc.) within FIG. 18 can deploy the illustrated hardware and components of system 1800. Computer system 1800 is programmed (e.g., via computer program code or instructions) to provide transition between map representations as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1800, or a portion thereof, constitutes a means for performing one or more steps of providing transition between map representations.

A bus 1810 includes one or more parallel conductors of information so that information is transferred quickly among devices coupled to the bus 1810. One or more processors 1802 for processing information are coupled with the bus 1810.

A processor (or multiple processors) 1802 performs a set of operations on information as specified by computer program code related to providing transitions between map representations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1800 also includes a memory 1804 coupled to bus 1810. The memory 1804, such as a random access memory (RAM) or any other dynamic storage device, stores information including processor instructions for providing transition between map representations. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or any other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent) storage device 1808, such as a magnetic disk, optical disk or flash card, for storing information, including instructions, that persists even when the computer system 1800 is turned off or otherwise loses power.

Information, including instructions for providing transitions between map representations, is provided to the bus 1810 for use by the processor from an external input device 1812, such as a keyboard containing alphanumeric keys operated by a human user, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a cathode ray tube (CRT), a liquid crystal display (LCD), a light emitting diode (LED) display, an organic LED (OLED) display, a plasma screen, or a printer for presenting text or images, and a pointing device 1816, such as a mouse, a trackball, cursor direction keys, or a motion sensor, for controlling a position of a small cursor image presented on the display 1814 and issuing commands associated with graphical elements presented on the display 1814. In some embodiments, for example, in embodiments in which the computer system 1800 performs all functions automatically without human input, one or more of external input device 1812, display device 1814 and pointing device 1816 is omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of ASICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners and external disks. In general the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 107 for providing transitions between map representations to the UE 101.

The term "computer-readable medium" as used herein refers to any medium that participates in providing information to processor 1802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1808. Volatile media include, for example, dynamic memory 1804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1820.

Network link 1878 typically provides information communication using transmission media through one or more networks to other devices that use or process the information. For example, network link 1878 may provide a connection through local network 1880 to a host computer 1882 or to equipment 1884 operated by an Internet Service Provider (ISP). ISP equipment 1884 in turn provides data communication services through the public, world-wide packet-switching communication network of networks now commonly referred to as the Internet 1890.

A computer called a server host 1892 connected to the Internet hosts a process that provides a service in response to information received over the Internet. For example, server host 1892 hosts a process that provides information representing video data for presentation at display 1814. It is contemplated that the components of system 1800 can be deployed in various configurations within other computer systems, e.g., host 1882 and server 1892.

At least some embodiments of the invention are related to the use of computer system 1800 for implementing some or all of the techniques described herein. According to one embodiment of the invention, those techniques are performed by computer system 1800 in response to processor 1802 executing one or more sequences of one or more processor instructions contained in memory 1804. Such instructions, also called computer instructions, software and program code, may be read into memory 1804 from another computer-readable medium such as storage device 1808 or network link 1878. Execution of the sequences of instructions contained in memory 1804 causes processor 1802 to perform one or more of the method steps described herein. In alternative embodiments, hardware, such as ASIC 1820, may be used in place of or in combination with software to implement the invention. Thus, embodiments of the invention are not limited to any specific combination of hardware and software, unless otherwise explicitly stated herein.

The signals transmitted over network link 1878 and other networks through communications interface 1870, carry information to and from computer system 1800. Computer system 1800 can send and receive information, including program code, through the networks 1880, 1890 among others, through network link 1878 and communications interface 1870. In an example using the Internet 1890, a server host 1892 transmits program code for a particular application, requested by a message sent from computer 1800, through Internet 1890, ISP equipment 1884, local network 1880 and communications interface 1870. The received code may be executed by processor 1802 as it is received, or may be stored in memory 1804 or in storage device 1808 or any other non-volatile storage for later execution, or both. In this manner, computer system 1800 may obtain application program code in the form of signals on a carrier wave.

Various forms of computer readable media may be involved in carrying one or more sequence of instructions or data or both to processor 1802 for execution. For example, instructions and data may initially be carried on a magnetic disk of a remote computer such as host 1882. The remote computer loads the instructions and data into its dynamic memory and sends the instructions and data over a telephone line using a modem. A modem local to the computer system 1800 receives the instructions and data on a telephone line and uses an infra-red transmitter to convert the instructions and data to a signal on an infra-red carrier wave serving as the network link 1878. An infrared detector serving as communications interface 1870 receives the instructions and data carried in the infrared signal and places information representing the instructions and data onto bus 1810. Bus 1810 carries the information to memory 1804 from which processor 1802 retrieves and executes the instructions using some of the data sent with the instructions. The instructions and data received in memory 1804 may optionally be stored on storage device 1808, either before or after execution by the processor 1802.

FIG. 19 illustrates a chip set or chip 1900 upon which an embodiment of the invention may be implemented. Chip set 1900 is programmed to provide transitions between map representations as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1900 can be implemented in a single chip. It is further contemplated that in certain embodiments the chip set or chip 1900 can be implemented as a single "system on a chip." It is further contemplated that in certain embodiments a separate ASIC would not be used, for example, and that all relevant functions as disclosed herein would be performed by a processor or processors. Chip set or chip 1900, or a portion thereof, constitutes a means for performing one or more steps of providing user interface navigation information associated with the availability of functions. Chip set or chip 1900, or a portion thereof, constitutes a means for performing one or more steps of providing transitions between map representations.

In one embodiment, the chip set or chip 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1900 includes merely one or more processors and some software and/or firmware supporting and/or relating to and/or for the one or more processors.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to provide transitions between map representations. The memory 1905 also stores the data associated with or generated by the execution of the inventive steps.

Figure 20:
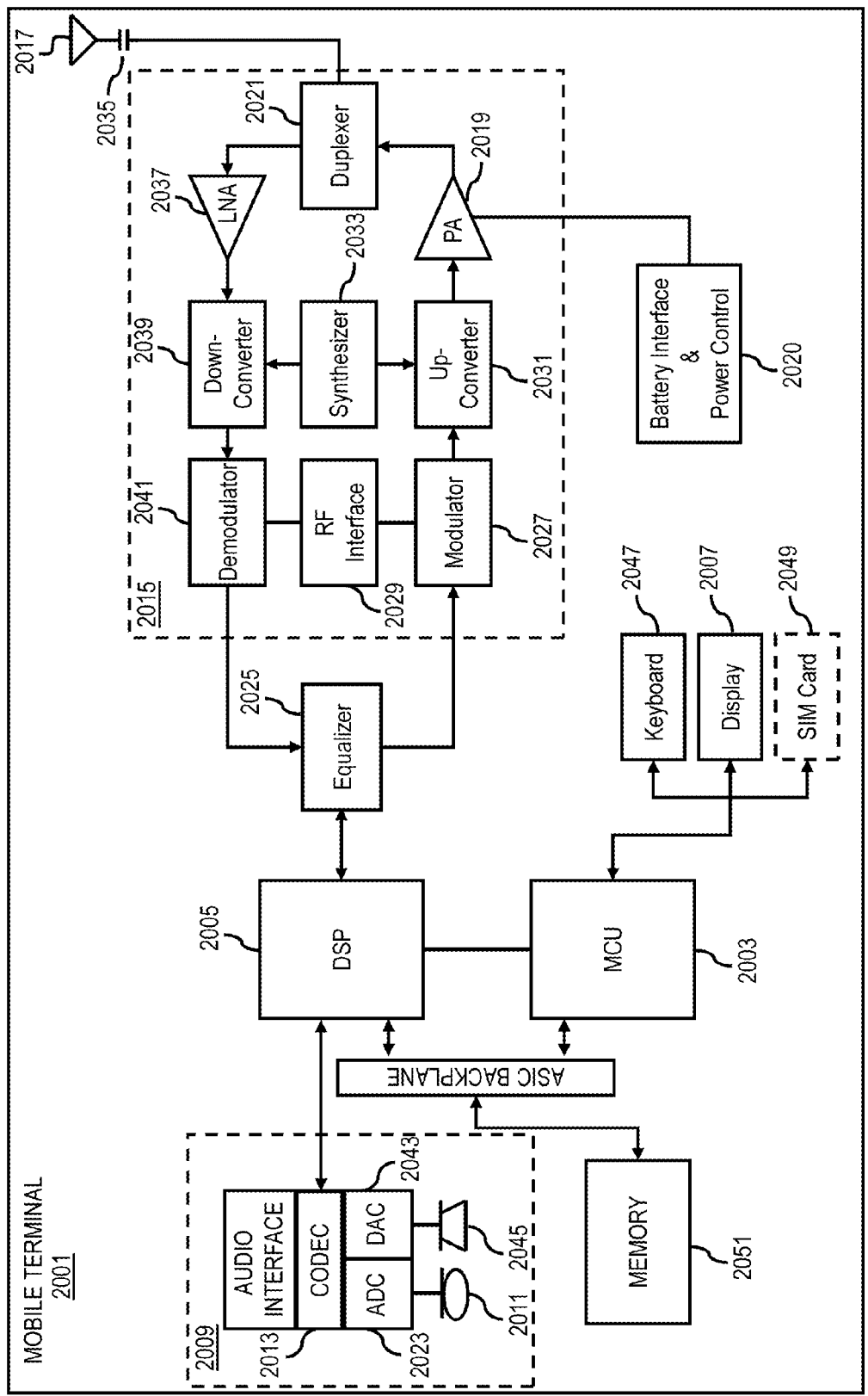
FIG. 20 is a diagram of a mobile terminal (e.g., handset) that can be used to implement an embodiment of the invention.

FIG. 20 is a diagram of exemplary components of a mobile terminal (e.g., handset) for communications, which is capable of operating in the system of FIG. 1, according to one embodiment. In some embodiments, mobile terminal 2001, or a portion thereof, constitutes a means for performing one or more steps of providing transitions between map representations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile terminal functions that perform or support the steps of providing transitions between map representations. The display 2007 includes display circuitry configured to display at least a portion of a user interface of the mobile terminal (e.g., mobile telephone). Additionally, the display 2007 and display circuitry are configured to facilitate user control of at least some functions of the mobile terminal. An audio function circuitry 2009 includes a microphone 2011 and microphone amplifier that amplifies the speech signal output from the microphone 2011. The amplified speech signal output from the microphone 2011 is fed to a coder/decoder (CODEC) 2013.

A radio section 2015 amplifies power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile terminal 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2025 for compensation of any frequency-dependent impairment that occurs during transmission though the air such as phase and amplitude distortion. After equalizing the bit stream, the modulator 2027 combines the signal with a RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003 which can be implemented as a Central Processing Unit (CPU) (not shown).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile terminal 2001 to provide transitions between map representations. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the terminal. The DSP 2005 may, depending upon the implementation, perform any of a variety of conventional digital processing functions on the voice signals. Additionally, DSP 2005 determines the background noise level of the local environment from the signals detected by microphone 2011 and sets the gain of microphone 2011 to a level selected to compensate for the natural tendency of the user of the mobile terminal 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable storage medium known in the art. The memory device 2051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2049 carries, for instance, important information, such as the cellular phone number, the carrier supplying service, subscription details, and security information. The SIM card 2049 serves primarily to identify the mobile terminal 2001 on a radio network.

The card 2049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    causing, at least in part, a presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface;
    determining at least one straight-line representation of the at least one spline representation;
    causing, at least in part, a transposing of the one or more map representations from the at least one spline representation to the at least one straight-line representation; and
    causing, at least in part, a presentation of one or more transition animations generated to show at least one transition from the at least one spline representation to the at least one straight-line representation,
    wherein an interaction performed by a user on the at least one straight-line representation causes a corresponding interaction with the at least one spline representation.

2. The method of claim 1, wherein the one or more map representations include, at least in part, one or more interactive user interface elements.

3. The method of claim 2, further comprising:
    maintaining the one or more interactive user interface elements during the at least one transition from the at least one spline representation to the at least one straight-line representation.

4. The method of claim 1, wherein the at least one transition animation includes, at least in part, a flattening of the at least one spline representation into the at least one straight-line representation.

5. The method of claim 4, further comprising:
    determining the flattening of the at least one spline representation with respect to at least one center point of the at least one spline representation.

6. The method of claim 1, further comprising:
    determining that there is a plurality of the at least one route; and
    causing, at least in part, a presentation of the plurality of the at least one route as at least one stacked representation of a plurality of the at least one straight-line representation.

7. The method of claim 1, further comprising:
    causing, at least in part, a presentation of the at least one straight-line representation in at least one first window of the at least one user interface; and
    causing, at least in part, a presentation of the at least one spline representation in at least one second window of the at least one user interface.

8. The method of claim 1, further comprising:
    if at least one interaction is determined with respect to the at least one straight-line representation, causing, at least in part, a corresponding interaction with the at least one spline representation; and
    if at least one interaction is determined with respect to the at least one spline representation, causing, at least in part, a corresponding interaction with the at least one straight-line representation.

9. The method of claim 1, wherein the at least one straight-line representation includes, at least in part, at least one skyline representation of the at least one map route, the one or more map objects, or a combination thereof.

10. An apparatus comprising:
    at least one processor; and
    at least one memory including computer program code for one or more programs,
    the at least one memory and the computer program code configured to, with the at least one processor, cause the apparatus to perform at least the following;
    cause, at least in part, a presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface;
    determine at least one straight-line representation of the at least one spline representation;
    cause, at least in part, a transposing of the one or more map representations from the at least one spline representation to the at least one straight-line representation; and
    cause, at least in part, a presentation of one or more transition animations generated to show at least one transition from the at least one spline representation to the at least one straight-line representation,
    wherein an interaction performed by a user on the at least one straight-line representation causes a corresponding interaction with the at least one spline representation.

11. The apparatus of claim 10, wherein the one or more map representations include, at least in part, one or more interactive user interface elements.

12. The apparatus of claim 11, wherein the apparatus is further caused to:
    maintain the one or more interactive user interface elements during the at least one transition from the at least one spline representation to the at least one straight-line representation.

13. The apparatus of claim 10, wherein the at least one transition animation includes, at least in part, a flattening of the at least one spline representation into the at least one straight-line representation.

14. The apparatus of claim 13, further comprising:
    determine the flattening of the at least one spline representation with respect to at least one center point of the at least one spline representation.

15. The apparatus of claim 10, further comprising:
    determine that there is a plurality of the at least one route; and
    cause, at least in part, a presentation of the plurality of the at least one route as at least one stacked representation of a plurality of the at least one straight-line representation.

16. The apparatus of claim 10, further comprising:
cause, at least in part, a presentation of the at least one straight-line representation in at least one first window of the at least one user interface; and
cause, at least in part, a presentation of the at least one spline representation in at least one second window of the at least one user interface.

17. A non-transitory computer-readable storage medium storing one or more sequences of one or more instructions which, when executed by one or more processors, cause an apparatus to perform:
causing, at least in part, a presentation of one or more map representations of at least one map route, one or more map objects associated with the at least one map route, or a combination thereof in at least one user interface, wherein the at least one map route is represented as at least one spline representation in a two-dimensional or a three-dimensional space represented in the at least one user interface;
determining at least one straight-line representation of the at least one spline representation;
causing, at least in part, a transposing of the one or more map representations from the at least one spline representation to the at least one straight-line representation; and
causing, at least in part, a presentation of one or more transition animations generated to show at least one transition from the at least one spline representation to the at least one straight-line representation,
wherein an interaction performed by a user on the at least one straight-line representation causes a corresponding interaction with the at least one spline representation.

18. The computer-readable storage medium of claim 17, wherein the one or more map representations include, at least in part, one or more interactive user interface elements.

19. The computer-readable storage medium of claim 18, wherein the apparatus is further caused to perform:
maintaining the one or more interactive user interface elements during the at least one transition from the at least one spline representation to the at least one straight-line representation.

* * * * *